United States Patent [19]

Lindstrom et al.

[11] 4,093,843
[45] June 6, 1978

[54] ELECTRON BEAM WELDING MACHINE

[75] Inventors: George Adam Lindstrom, Greenwood; Robert Charles Holland, Danville, both of Ind.

[73] Assignee: Union Carbide Corporation, New York, N.Y.

[21] Appl. No.: 778,621

[22] Filed: Mar. 17, 1977

[51] Int. Cl.² ............................................. B23K 9/00
[52] U.S. Cl. ........................................... 219/121 EB
[58] Field of Search ................. 219/121 EB, 121 EM

[56] References Cited

U.S. PATENT DOCUMENTS

| | | |
|---|---|---|
| 3,222,496 | 12/1965 | Windebank ................. 219/121 EB |
| 3,731,052 | 5/1973 | Ogawa et al. ................. 219/121 EB |
| 3,742,365 | 6/1973 | Sciaky ........................... 219/121 EB |

Primary Examiner—J. V. Truhe
Assistant Examiner—Fred E. Bell
Attorney, Agent, or Firm—John R. Doherty

[57] ABSTRACT

An electron beam welding machine incorporating a surface seal system which continuously seals the weld chamber located in an indexing table while such chamber is indexed beneath a seal plate carrying the surface seal material. As a result of the pressure differential involved, the seal surface also acts as a bearing surface as the wear plate on the indexing table moves in contact with the seal surface.

7 Claims, 5 Drawing Figures

ELECTRON BEAM WELDING MACHINE

This invention relates to an electron beam machine and more particularly to such a machine including an indexing table containing a plurality of individual welding chambers which must be loaded with the part to be welded and pumped down to a welding vacuum.

Electron beam machines of the type contemplated by this invention must necessarily incorporate some sort of sealing arrangement between a member which carries the electron beam gun and the rotating indexing table to achieve and maintain the necessary vacuum pressures required for electron beam welding.

Industry is constantly seeking new and improved ways to achieve such a seal. Prior art arrangements all used an elastomeric type sealing material which because of its very nature required compression and or extrusion for achieving a seal and, therefore, results in high sliding coefficient of friction. These sealing arrangements, therefore, are constantly lubricated in order to reduce the friction encountered. Also such sealing arrangements are susceptible to welding vapor and particle degradation. In other prior art systems the access to the welding chamber is through the top of the indexing table thus requiring a hole large enough to permit passage of the part to be welded into the chamber. This, of course, degrades the effectiveness of the seal due to the large area which has to be dynamically sealed.

The machine of the present invention substantially eliminates all of the above problems and because of the novel sealing system utilized permits several ancillary advantages which will either be specifically pointed out or will become obvious from the following detailed description of certain preferred embodiments and the drawing wherein.

Figure 1:
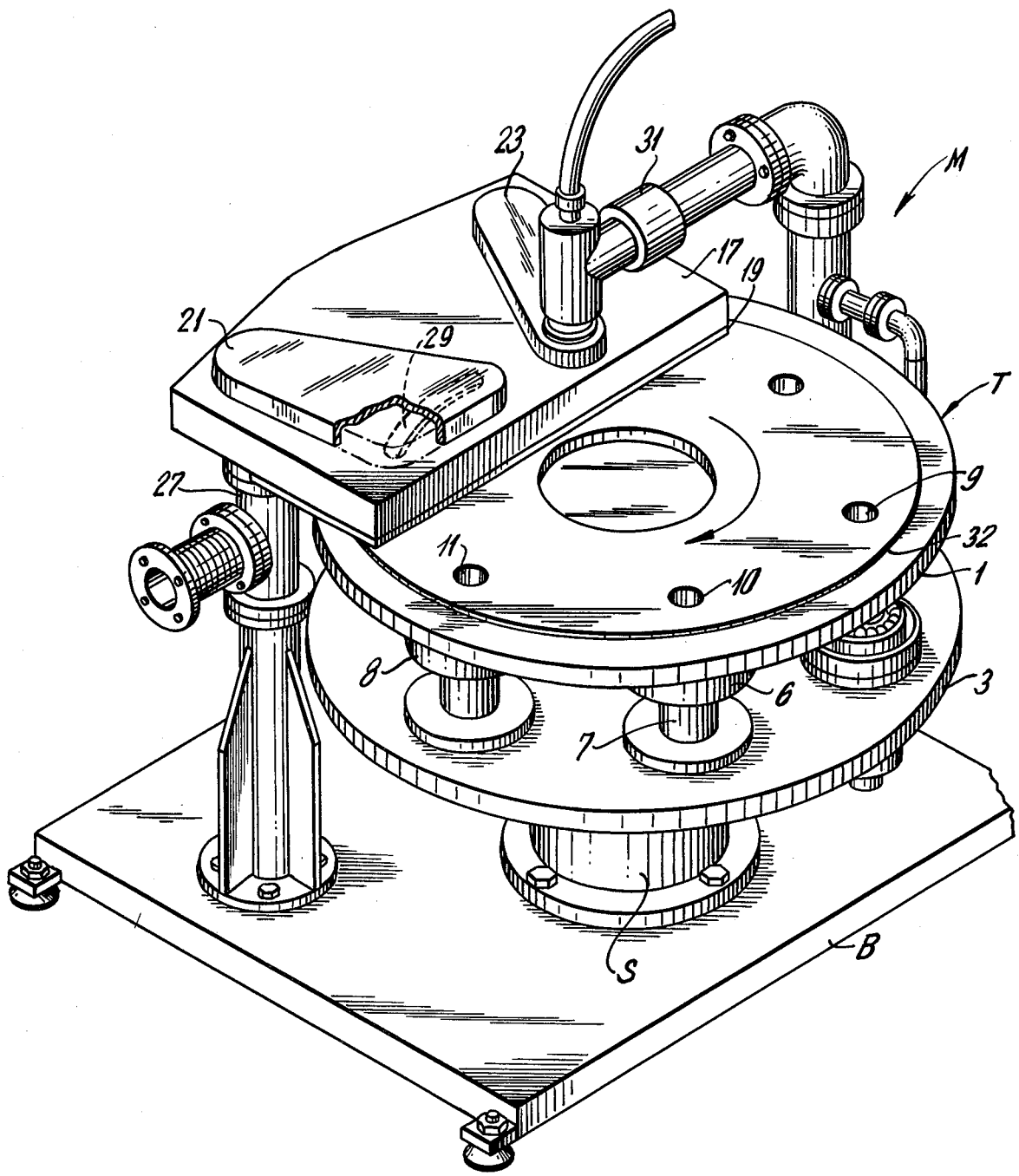
FIG. 1 is a pictorial representation of a machine incorporating the system of the invention.
Figure 2:
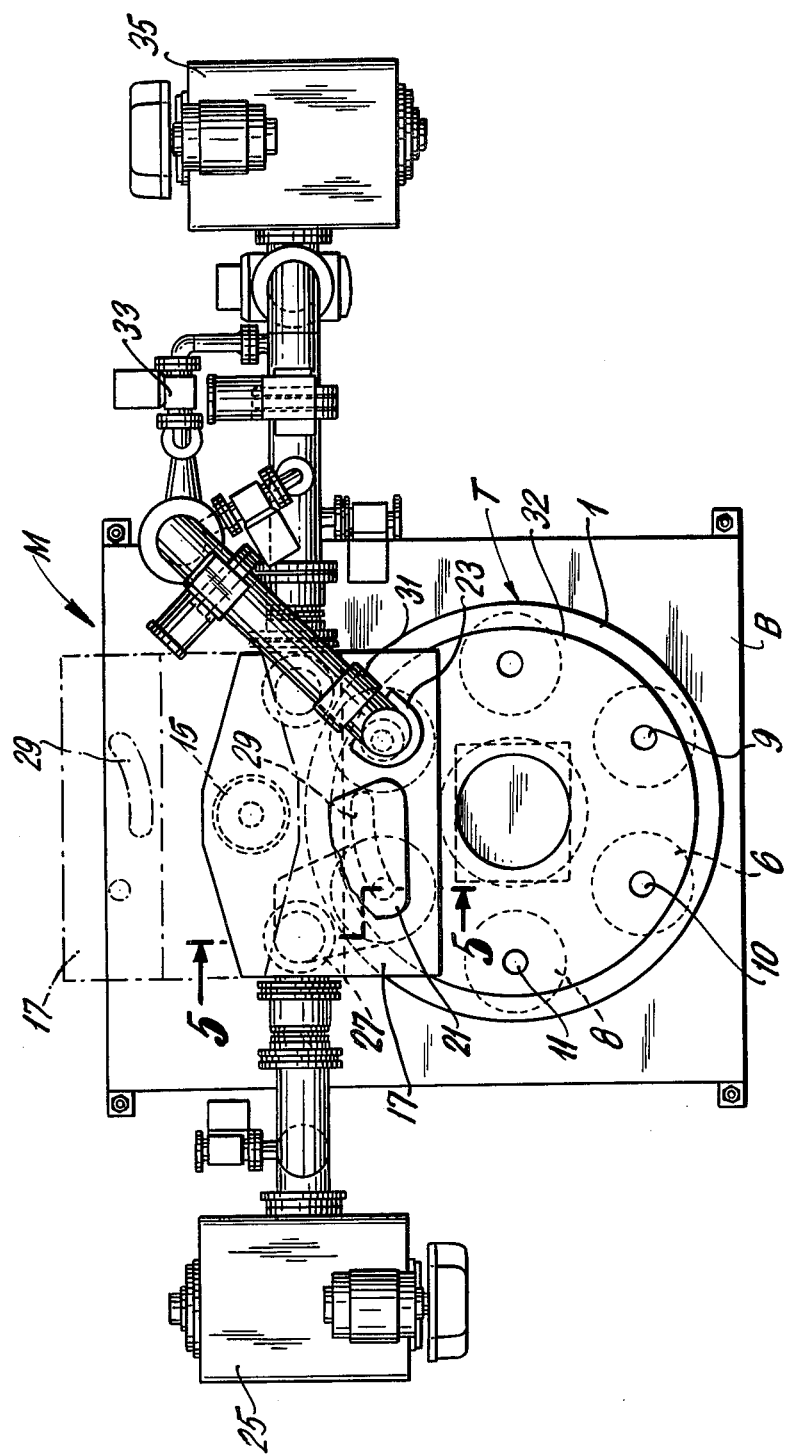
FIG. 2 is a top view of the machine of the invention showing in phantom the seal plate rotated 180 degrees.
Figure 3:
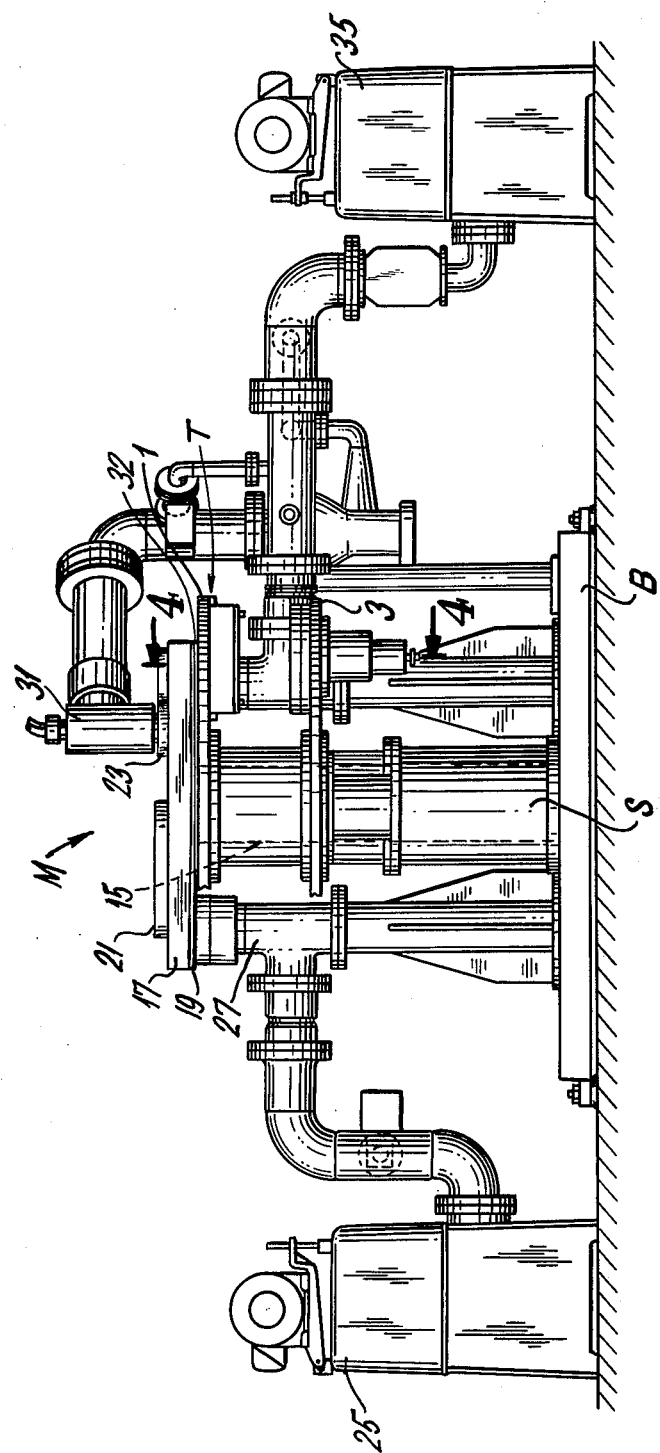
FIG. 3 is a front elevation view of the machine of the invention.

FIG. 1 illustrates a typical electron beam machine incorporating the sliding seal and other features which can be utilized because of the novel sliding seal of this invention. The machine M comprises a base B upon which is mounted a support member S. The support member S carries a table T and is provided with means for rotating said table T in indexing fashion. The table T consists of a top plate 1 and a bottom plate 3. Between the top and bottom plates are a plurality of welding chambers 5, 6 and 8 etc. located equidistance around the circumference of the table T. Each chamber is mounted on a vertical stanchion 7 which can be moved vertically to open the chamber (as shown at chamber 5) to load the part to be welded in such chamber and then raised to communicate with and seal a corresponding number of openings 9, 10, 11 etc. in the top plate 1 of table T. The machine M also has mounted on base B a vertical member 15 (See FIG. 2) which supports a seal plate 17. Seal plate 17 is above and at least partially in contact with the top plate 1 of table T. The seal plate 17 has a seal and bearing surface 19 (See FIG. 5) on the lower side of said plate which is in intimate contact with said top plate 1. Top plate 1 has a stainless steel wear plate 32 (See FIG. 4) which contacts the seal and bearing surface 19. The vertical member 15 is capable of lifting the seal plate 17 from the table T and rotating the plate 17, 180 degrees as shown in phantom in FIG. 2 so that the seal and bearing surface 19 may be easily replaced as necessary. Further, the seal plate 17 has two separate pumping chambers 21 and 23 respectively. Pump chamber 21 is connected to vacuum pump means 25 through slip connection 27. The bottom surface of chamber 21 has a slot-like opening 29 which commumicates with openings 11, 10, 9 etc. leading to the weld chambers 8, 6, 5 etc. The slot permits continued pumping of the weld chambers as they are indexed into the weld position. Chamber 23 has provided through the top surface thereof an electron beam gun 31. The gun 31 has a vacuum pump 33 for maintaining the required vacuum in the gun. The chamber 23 has a vacuum pump 35 connected thereto to maintain the weld chamber at welding vacuum.

Figure 4:
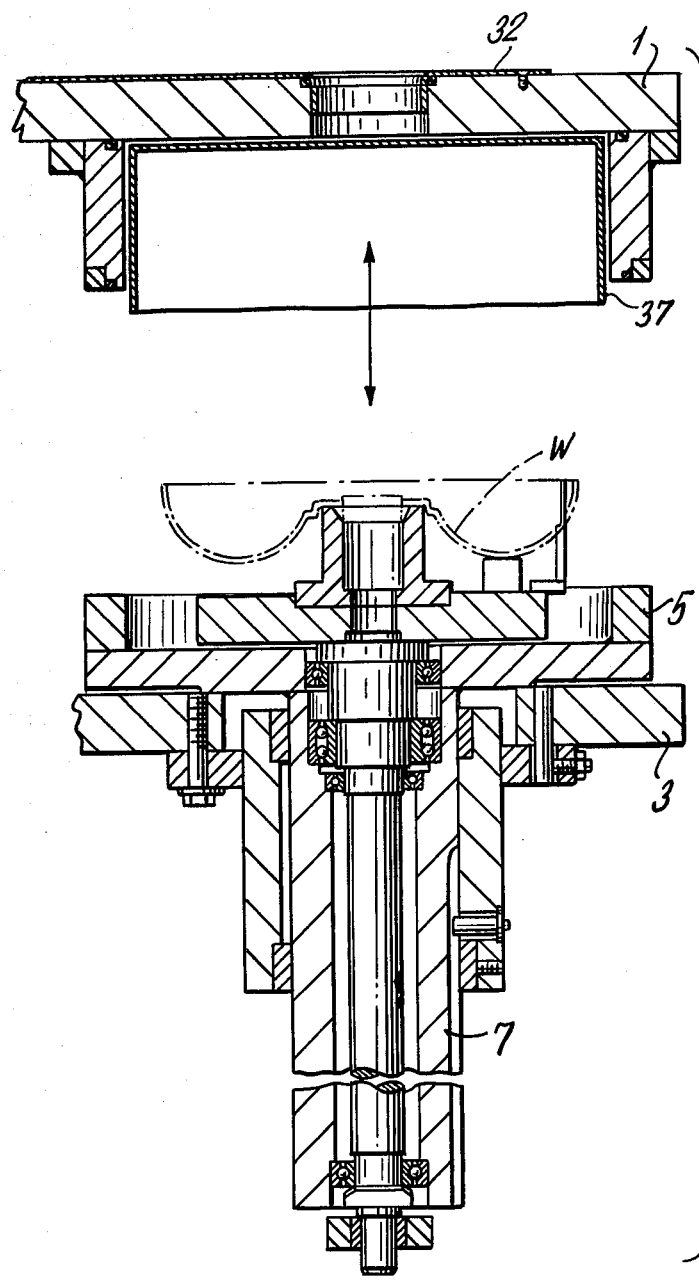
FIG. 4 is a section taken along the line 4—4 in FIG. 3 showing a weld chamber in the open position.
Figure 5:
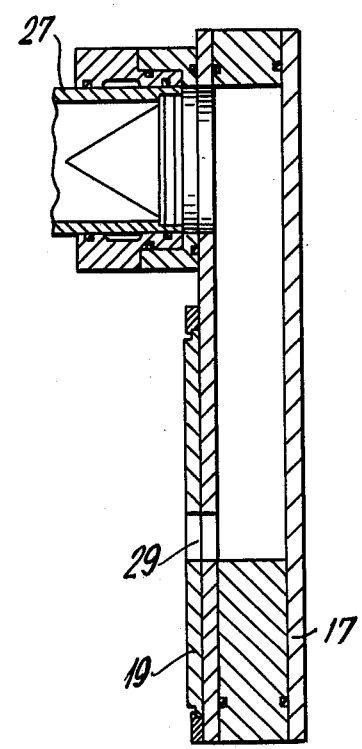
FIG. 5 is a section taken along the line 5—5 in FIG. 2 showing the slip coupling between the seal plate and the vacuum line.

Referring to FIG. 4, each weld chamber 5, 6 and 8 has provided therein a vapor shield 37. The vapor shield 37 has a hole only large enough for the beam diameter to pass. This in combination with a minimum hole diameter in the top plate 1 prevents metal oxides from entrapment between the seal surface 19 and wear plate 32.

In operation, a workpiece W is loaded into the bottom of the weld chambers (see FIG. 4). The chamber is then raised until it seals with the top of the plate 1 of Table T. The table is indexed to the position where the chamber is prepumped to a minimum vacuum of approximately 100 microns. Because of the slot 29 prepump may continue while the table is indexed until the chamber is nearing the weld position. In this position the vacuum is maintained at 100 microns or improved. The electron beam then makes the weld and the chamber is indexed to the unload position.

The surface material 19 is typically a copper filled (tetrafluoroethylene). The surface seal of this invention acts as a continuous seal and bearing surface which provides a long life, reducing maintenance period. Further, the seal provides complete isolation between the atmosphere and the prepump station and also between the prepump and weld station.

Having described the invention with reference to certain preferred embodiments it should be understood that modifications can be made thereto without departing from the spirit and scope of this invention. For example, if desired, in order to minimize leaks into the weld chamber during welding, it is possible to surround the second pump opening with a separate third pump opening connected to a third vacuum pump. This arrangement maintains a differential pressure between the welding vacuum and the atmosphere.

What is claimed is:

1. An electron beam welding machine comprising:
    (a) a moveable weld table containing therein a plurality of openings each communicating with a weld chamber for housing parts to be welded and each opening being provided for passing an electron beam therethrough and for evacuating said chambers to welding vacuum;
    (b) a seal plate above and at least partially in contact with the top surface of said weld table; said seal plate having a flat seal and bearing surface which is coextensive with at least a substantial portion of the top surface of said weld table surrounding said openings and which is composed of a low friction, compressible, wear resistant material, said seal plate being in intimate contact with the top surface of said table and having a first pump chamber and a separate second pump chamber therein;

(c) means for moving said weld table in an indexing fashion against said seal and bearing surface;

(d) first vacuum pump means connected to the first pump chamber in said seal plate to create a vacuum in said weld chambers as such chambers are indexed into registry with said pump chamber;

(e) second vacuum pump means connected to such second pump chamber in said seal plate to at least maintain said vacuum, the arrangement being such that said seal plate is allowed to move relative to the top surface of said weld table without destroying said vacuum; and (f) an electron beam welding gun connected to said seal plate at said second pump chamber for passing an electron beam from said gun through said second pump chamber into said weld chambers for welding the parts therein.

2. Machine according to claim 1 wherein said table is circular.

3. Machine according to claim 1 wherein said weld table has a wear plate thereover.

4. Machine according to claim 1 wherein said seal and bearing surface has a third pump chamber surrounding, but separate from said second pump chamber with third vacuum pump connected thereto so that a differential pressure is maintained between the vacuum in the second pump chamber and the atmosphere whereby leakage into second pump chamber from atmosphere due to degradation of the seal surface is minimized.

5. Machine according to claim 1 wherein said seal and bearing surface material is a copper filled TFE.

6. An electron beam welding machine comprising:

(a) a moveable weld table containing therein a plurality of openings each communicating with a weld chamber for housing parts to be welded and each opening being provided for passing an electron beam therethrough and for evacuating said chambers to welding vacuum;

(b) a seal plate above and at least partially in contact with the top surface of said weld table; said seal plate having a seal and bearing surface material in intimate contact with the top surface of said table and having a first pump chamber and a separate second pump chamber therein.

(c) means for moving said weld table in an indexing fashion against said seal and bearing surface;

(d) first vacuum pump means connected to the first pump chamber in said seal plate to create a vacuum in said weld chambers as such chambers are indexed into registry with said pump chamber;

(e) second vacuum pump means connected to such second pump chamber in said seal plate to at least maintain said vacuum;

(f) an electron beam welding gun connected to said seal plate at said second pump chamber for passing an electron beam from said gun through said second pump chamber into said weld chambers for welding the parts therein; and (g) means for raising said seal plate out of contact with said weld table and for rotating said seal plate 180° whereby the seal and bearing surface can easily be replaced.

7. An electron beam welding machine comprising:

(a) a moveable weld table comprising a top plate and a bottom plate having a plurality of weld chambers positioned therebetween, said top plate containing a plurality of openings each communicating with a weld chamber for housing parts to be welded and each opening being provided for passing an electron beam therethrough and for evacuating said chambers to welding vacuum;

(b) a seal plate above and at least partially in contact with the top surface of said weld table; said seal plate having a seal and bearing surface material in intimate contact with the top surface of said table and having a first pump chamber and a separate second pump chamber therein;

(c) means for moving said weld table in an indexing fashion against said seal and bearing surface;

(d) first vacuum pump means connected to the first pump chamber in said seal plate to create a vacuum in said weld chambers as such chambers are indexed into registry with said pump chamber;

(e) second vacuum pump means connected to such second pump chamber in said seal plate to at least maintain said vacuum;

(f) means for vertically moving said weld chambers so that the weld chambers may be lowered to load a part to be welded therein and raised to communicate with and seal the openings in said top plate; and (g) an electron beam welding gun connected to said seal plate at said second pump chamber for passing an electron beam from said gun through said second pump chamber into said weld chambers for welding the parts therein.

* * * * *